(12) United States Patent
Beck

(10) Patent No.: US 8,146,897 B2
(45) Date of Patent: Apr. 3, 2012

(54) SELF-PUMPING HYDROPNEUMATIC SPRING STRUT WITH INTERNAL LEVEL CONTROL

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1013 days.

(21) Appl. No.: 12/150,290

(22) Filed: Apr. 25, 2008

(65) Prior Publication Data

US 2008/0265476 A1    Oct. 30, 2008

(30) Foreign Application Priority Data

Apr. 28, 2007  (DE) .......................... 10 2007 020 118

(51) Int. Cl.
*B60G 17/00* (2006.01)
*F16F 9/14* (2006.01)

(52) U.S. Cl. .................... 267/64.17; 267/35; 267/64.11; 267/64.16; 267/64.19; 267/64.25; 267/64.27; 188/266.5; 188/266.6; 188/289; 188/315; 188/322.2

(58) Field of Classification Search ............... 267/64.17, 267/64.19, DIG. 2; 188/266.5, 266.6, 313–315, 188/322.13

See application file for complete search history.

(56) References Cited

U.S. PATENT DOCUMENTS

| 4,993,693 | A | 2/1991 | Löhr et al. | |
| 6,494,441 | B2 * | 12/2002 | Beck et al. ................. | 267/64.16 |
| 6,553,761 | B2 | 4/2003 | Beck | |
| 2003/0213664 | A1* | 11/2003 | Beck .............................. | 188/289 |
| 2004/0118648 | A1* | 6/2004 | Beck ........................... | 188/322.2 |
| 2006/0013717 | A1* | 1/2006 | Beck .............................. | 417/540 |
| 2007/0085247 | A1* | 4/2007 | Beck .......................... | 267/64.17 |

* cited by examiner

*Primary Examiner* — Robert Siconolfi
*Assistant Examiner* — San Aung
(74) *Attorney, Agent, or Firm* — Cozen O'Connor

(57) ABSTRACT

Self-pumping hydropneumatic spring strut includes a working cylinder divided into first and second working spaces by a working piston carried on a hollow piston rod; a high pressure chamber and a low pressure chamber partially filled with hydraulic damping medium, the high pressure chamber having a gas cushion and being connected to the second working space; and a piston pump including a pump rod extending into the hollow piston rod, the pump rod having a bore connected to the low pressure chamber, an end provided with a suction valve inside the hollow piston rod, and a deregulating opening, which is closable as a function of position of the working piston in the working cylinder. An adjustable damping valve located outside the external tube has a first flow connection connected to the first working space, and a second flow connection connected to the second working space and the high pressure chamber.

9 Claims, 3 Drawing Sheets

US 8,146,897 B2

SELF-PUMPING HYDROPNEUMATIC SPRING STRUT WITH INTERNAL LEVEL CONTROL

BACKGROUND OF THE INVENTION

1. Field of the Invention

The invention pertains to a self-pumping hydropneumatic spring strut with internal level control, especially for motor vehicles, with a damping medium-filled working cylinder under the pressure of at least one gas cushion located in a high-pressure chamber and acting as a spring, the working cylinder being divided into two working spaces by a working piston carried by a hollow piston rod.

A piston pump, which is driven by the movements of the spring, conveys damping medium from a low-pressure chamber into the working space connected to the high-pressure chamber, the pump cylinder of the piston pump being formed by the hollow piston rod. A hollow pump rod, which is attached to the working cylinder and carries at its forward end a suction valve, travels in the bore of the hollow pump rod, which is connected with the low-pressure chamber with a control opening, which can be closed as a function of the position of the working piston in the working cylinder, and which connects the working space connected to the high-pressure chamber to a control channel, which is itself equipped with a throttle and which opens out into the low-pressure chamber.

A first channel extends from one of the working spaces to an adjustable damping valve, which is connected to the other working space and to the high-pressure chamber by way of a second channel.

2. Description of the Related Art

U.S. Pat. No. 4,993,693 discloses a spring strut having an internal level control system which uses a piston pump to convey damping medium from a low-pressure chamber into the working space connected to the high-pressure chamber. This spring strut is also provided with an adjustable damping valve, which controls the damping force and is continuously variable during operation of the vehicle.

SUMMARY OF THE INVENTION

An object of the invention is to improve a self-pumping hydropneumatic spring strut with internal level control and continuously variable damping force adjustment in such a way that a longer damping stroke can be achieved without increasing the axial length of the unit.

According to the invention, the adjustable damping valve is installed outside the spring strut, and the first channel and the second channel are connected to flow connections for carrying the flow to and away from the adjustable damping valve.

Installing the adjustable damping valve outside the self-pumping hydropneumatic spring strut is advantageous, because it creates a corresponding space inside the working cylinder, a space which allows a much longer axial stroke of the working piston. Conversely, for a given axial length of the spring strut, this design makes it possible to increase the previously available axial travel of the working piston inside the working cylinder.

According to another essential feature, the working piston is designed without valves, and the flow arrives at the adjustable damping valve from different directions depending on whether the piston is moving in the push or pull direction. The advantage here is that the spring strut is designed without damping valves and also without check valves on the working piston and on the bottom piece, with the result that the flow arrives at the adjustable damping valve from one direction during the push stage and from a different direction during the pull stage. In this case the damping force is controlled exclusively by the adjustable damping valve.

According to another essential feature, the working piston and the bottom piece of the working cylinder are each provided with at least one check valve, so that the damping medium flows in the same direction regardless of whether the working piston is traveling in the pull direction or in the push direction and arrives at the damping valve in the same direction in both cases.

It is advantageous for the spring strut to have corresponding check valves both in the working piston and in the bottom piece. These valves ensure that the damping medium flows in the same direction during damping. The means that both in the pull stage and in the push stage, that is, both when the piston rod is traveling inward and when the piston rod is traveling outward, the damping medium arrives at the adjustable damping valve from the same direction. The damping valve is used here to achieve the appropriate damping force, although additional damping force can be produced by the check valves, depending on the pretensioning of the check valves or depending on the throttle cross section of the bores in the check valve in question.

According to a design which is favorable for manufacturing reasons, the adjustable damping valve is installed in a housing, which is mounted on the outer tube of the spring strut.

If there is only limited space available in the vehicle, it is possible in accordance with another embodiment to install the adjustable damping valve in a housing which is in a space separate from the spring strut. The advantage here is that the adjustable damping valve can be mounted in a suitable location in the vehicle and connected to the spring strut by hydraulic lines.

According to another essential feature, one of the channels is formed by the outer lateral surface of the working cylinder and by a tube coaxially surrounding the working cylinder.

According to another embodiment, one of the channels and the channel leading to the high-pressure chamber are located in an intermediate part, which is pushed axially into the outer tube of the spring strut and sealed in place there.

According to another feature, the intermediate part is located radially inside the working cylinder and/or the tube and sealed in place there.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
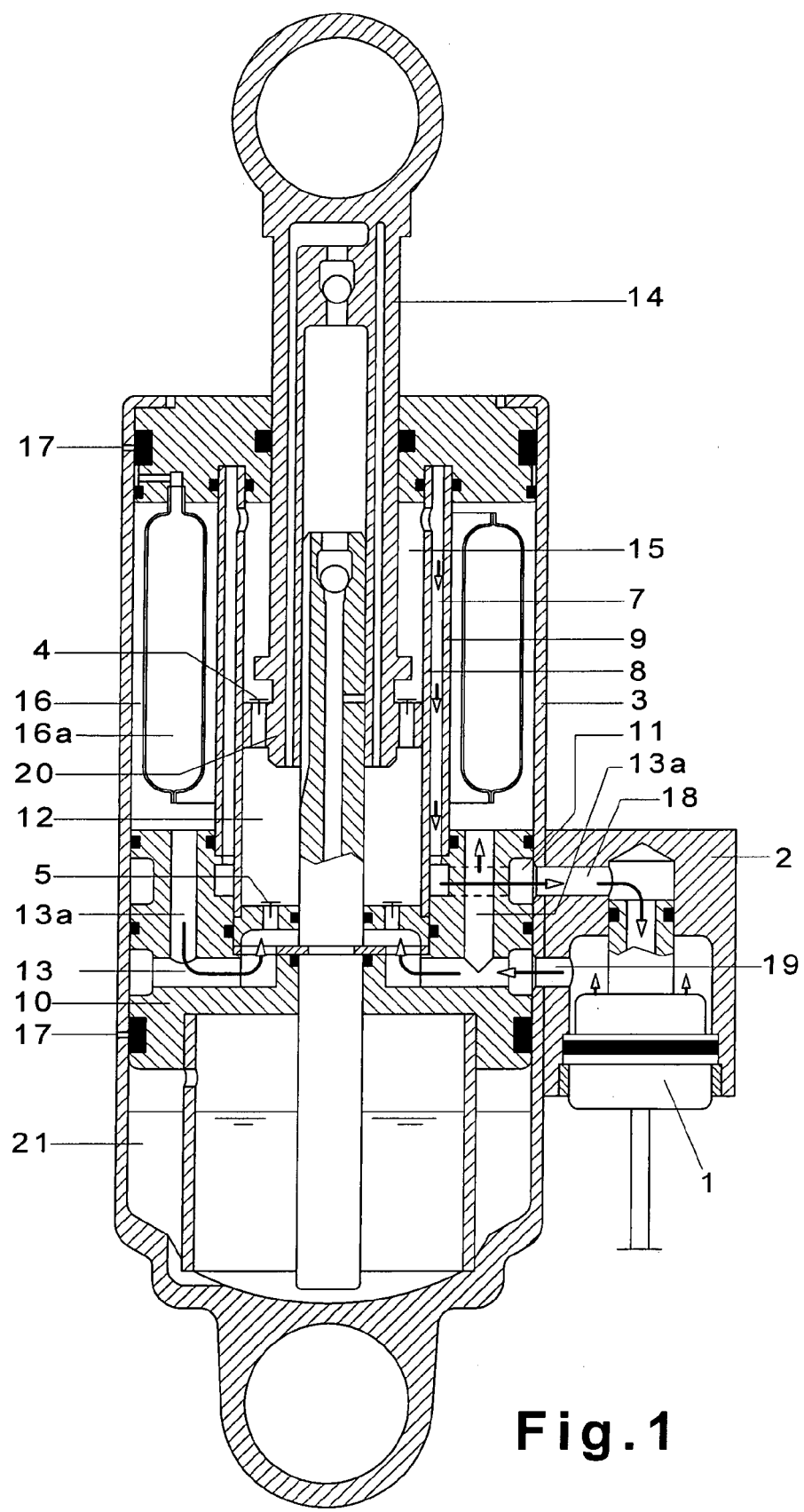
FIG. 1 shows a cross section through a spring strut with internal level control and check valves in the working piston and in the bottom piece.

The self-pumping hydropneumatic spring strut with internal level control shown in FIG. 1 includes essentially of the working cylinder 8 of the spring strut, in which a working piston 20 slides, the piston being located at the end of a piston rod 14. The working cylinder 8 is sealed off at one end by a bottom piece and at the other end by a piston rod guide, through which the piston rod 14 passes in a sealed manner to the outside. The bottom piece is attached by means of a fastening part to the body of the vehicle or to the chassis and the piston rod 14 is attached by means of another fastening part to the chassis or to the body of the vehicle in a manner not shown.

The working cylinder 8 is surrounded by an annular compensating space partially filled with damping medium and partially filled with gas. This space is divided by an intermediate part 10 into a high-pressure chamber 16, 16a and a low-pressure chamber 21. The high-pressure chamber 16 is filled with damping medium, whereas gas, introduced from the outside, is held in a sealed-off gas space 16a. The damping medium and low-pressure gas cushion present in the low-pressure chamber 21 are not separated from each other. The level of the damping medium is indicated schematically. In the equilibrium state, that is, in the state before pumping-up has occurred, the pressure in the low-pressure chamber 21 is the same as that in the high-pressure chamber 16, 16a.

The function of the pumping up and deregulation (depressurizing) of the hydropneumatic spring strut with internal level control is described in U.S. Pat. No. 4,993,643, which is incorporated herein by reference.

In the case of the hydropneumatic spring strut shown in FIG. 1, the adjustable damping valve 1 is installed in a housing 2, which is permanently connected to the outer tube 3.

During the pull stage, the piston check valve 4 closes, whereas the bottom check valve 5 opens. While the piston rod 14, together with the working piston 20, travels outward, the piston ring volume of the working piston 20 is conveyed through the channel 7 between the working cylinder 8 and the tube 9 into a circumferential groove 11 made in the outside diameter of the intermediate part 10. Proceeding from this groove 11, the damping medium flows through a flow connection 18 to the adjustable damping valve 1, toward which the flow can proceed in only this direction; the damping medium undergoes its damping here and is then drawn back into the lower working space 12 via the flow connection 19 and channel 13, and the damping medium previously displaced by the piston rod during the push stage joins the flow of damping medium coming from the high-pressure chamber 16 via the channel 13.

During the push stage, i.e., when the piston rod is traveling inward, the piston check valve 4 opens, whereas the bottom check valve 5 closes. The damping medium displaced by the piston rod 14 also passes from the upper working space 15 via the channel 7 through the adjustable damping valve 1 and then enters the high-pressure chamber 16 via the channel 13 and 13a against the elastic force of the high-pressure gas 16a.

The annular surface of the piston is the determining factor for the displacement which occurs in the pull direction, whereas the surface of the piston rod is the major influence during the push stage; each is determining with respect to the damping force achieved. A spread in the damping force between the pull and push stages can be achieved by selecting the appropriate dimensions of these components.

Figure 2:
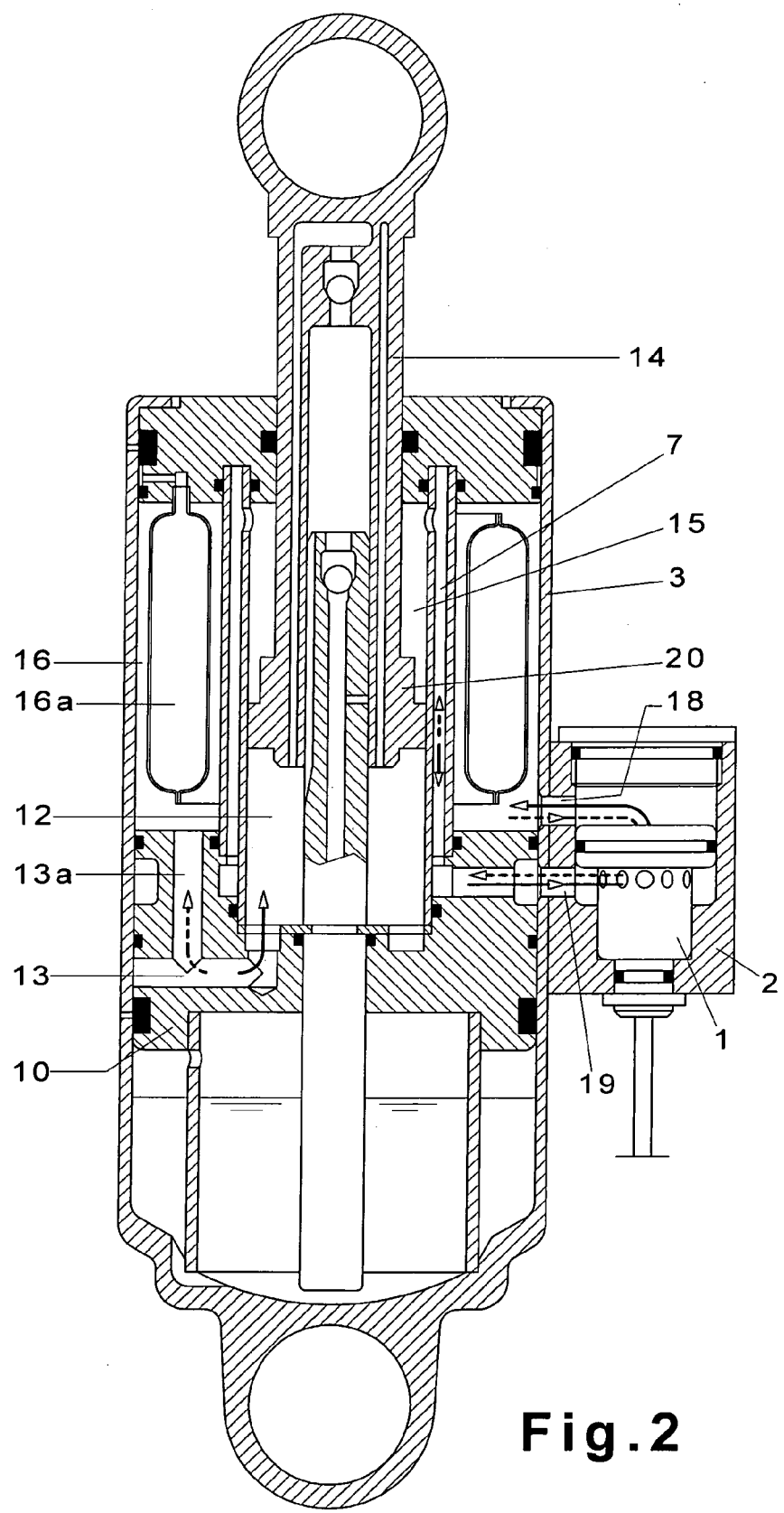
FIG. 2 shows a cross section through a spring strut with internal level control without check valves in the working piston or in the bottom piece.

FIG. 2 shows another embodiment of a self-pumping hydropneumatic spring strut with internal level control. Here the working piston 20 and the intermediate part 10 are designed without check valves. The adjustable damping valve 1 is installed outside the outer tube 3 in a housing 2. The flow can arrive at the damping valve 1 from both sides, namely, either through the flow connection 18 or through the flow connection 19.

During the pull stage, the piston ring volume is moved from the upper working space 15 via the channel 7 through the damping valve 1, and the piston rod volume of the piston rod 14 is again pushed from the high-pressure chamber 16 via the channel 13a, 13 into the lower working space 12.

During the push stage, the piston ring volume is conveyed from the lower working space 12 and through the flow connection 19 and the damping valve 1, whereas the piston rod volume is again pushed via the channels 13, 13a into the high-pressure chamber 16.

The spread between the damping force during the pull stage and that during the push stage is produced here by the damping valve 1 itself.

Figure 3:
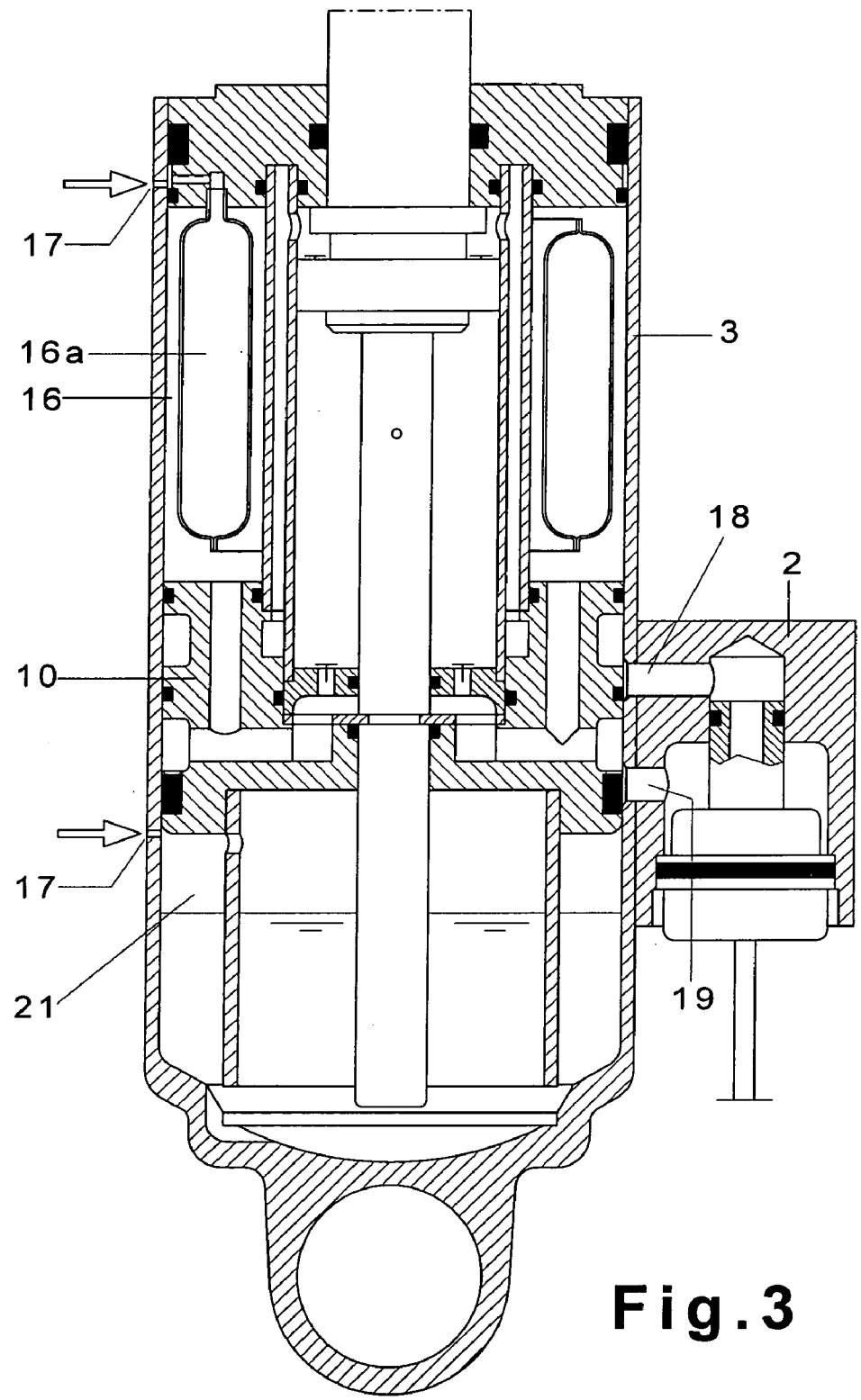
FIG. 3 shows a gas filling method for filling a spring strut according to FIG. 1 or FIG. 2.

FIG. 3 shows the spring strut of FIG. 1 before it has been filled with compressed gas. The housing 2 of the adjustable damping valve 1 is permanently connected to the outer tube 3, so that only the intermediate part 10, together with the other components in the outer tube, is free to move in the axial direction. The intermediate part is sealed off appropriately against the inside wall of the outer tube 3 by appropriate seals on its outside circumference. The flow connections 18 and 19 communicate with the openings in the outer tube 3 but are closed off by the axially displaced intermediate part 10. In the position shown here, the inlets 17 communicate directly with the low-pressure chamber 21 and with the compressed gas space 16a of the high-pressure chamber 16. After the low-pressure chamber 21 and the compressed gas 16a have been filled, the position according to FIG. 1 is achieved by axial insertion so that now the flow connections 18 and 19 communicate with the corresponding channels in the intermediate part 10, and simultaneously the inlets 17, as can be seen in FIG. 1, are sealed off by the corresponding seals. The end area of the outer tube 3 can then be flanged over, as also shown in FIG. 1, so that now the entire spring strut is closed and sealed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic spring strut with internal level control, the strut comprising:
   an external tube;

a working cylinder filled with hydraulic damping medium and divided into first and second working spaces by a working piston carried on a hollow piston rod;

a compensating space located between the external tube and the working cylinder, the compensating space comprising a high pressure chamber and a low pressure chamber partially filled with hydraulic damping medium, the high pressure chamber having a gas cushion and being connected to the second working space;

a piston pump which conveys damping medium from the low pressure chamber into the second working space, the piston pump comprising a hollow pump rod fixed to the working cylinder and extending into the hollow piston rod, the hollow pump rod having a bore connected to the low pressure chamber, an end provided with a suction valve inside the hollow piston rod, and a deregulating opening, which is closable as a function of position of the working piston in the working cylinder, connecting the second working space to the bore;

an adjustable damping valve located outside the external tube and having a flow connection connected to a first channel connected to the first working space, and a flow connection connected to a second channel connected to the second working space and the high pressure chamber; and an intermediate part pressed into the external tube and sealed in place, the intermediate part separating the high pressure chamber from the low pressure chamber, at least one of the first and second channels being formed in part in the intermediate part, wherein connections between the adjustable damping valve and the working chambers are arranged in the intermediate part, and an inlet port and an outlet port of the damping valve are only connected with the high pressure fluid clamber.

2. The spring strut of claim 1 wherein the working piston has no valves connecting the working spaces, the flow connections each receiving flow in opposite directions, depending the direction of movement of the piston in the working cylinder.

3. The spring strut of claim 1 wherein the piston and the second working space are each provided with at least one check valve arranged so that the hydraulic damping medium flows in the same direction regardless of the direction of movement of the piston in the working cylinder.

4. The spring strut of claim 1 wherein the adjustable damping valve is installed in a housing which is fixed to the external tube.

5. The spring strut of claim 1 wherein the adjustable damping valve is mounted remotely from the external tube, the flow connections being connected to the first and second channels by hydraulic lines.

6. The spring strut of claim 1 further comprising an internal tube surrounding said working cylinder coaxially, said first channel being formed in part by the working cylinder and the internal tube.

7. The spring strut of claim 1 wherein part of the intermediate part is received inside the working cylinder and sealed in place.

8. The spring strut of claim 1 wherein an extension force is independent of an adjustment of the damping valve.

9. The spring strut of claim 1 wherein the flow connection provides for flow in two directions.

* * * * *